May 21, 1968

T. N. THIELE 3,384,799

SYSTEM FOR CONTROLLING FIELD SHUNTING OF DIRECT
CURRENT SERIES MOTOR

Filed Aug. 2, 1965

Inventor
Tom N. Thiele
By R J Falkowski
Attorney 3,384,799
SYSTEM FOR CONTROLLING FIELD SHUNTING
OF DIRECT CURRENT SERIES MOTOR
Tom N. Thiele, Milwaukee, Wis., assignor to Allis-
 Chalmers Manufacturing Company, Milwaukee,
 Wis.
Filed Aug. 2, 1965, Ser. No. 476,293
8 Claims. (Cl. 318—249)

ABSTRACT OF THE DISCLOSURE

A system for controlling speed of a DC series motor over a wide range includes pulse width modulation means for varying the effective voltage delivered to the motor and static means for connecting a resistance in shunt to the motor field winding when the motor current is below a first predetermined level and for disconnecting the shunting resistance when the motor current is above another level greater than said first predetermined level.

---

This application relates to motor control systems, particularly motor control systems that are utilized to control current through a motor to vary speed or torque automatically in response to the amount of current in the motor circuit.

In operating direct current motors it is often desirable to provide means for controlling speed by control of field excitation as well as by normal armature control. Means are usually provided to operate the motor over a continuous range with armature control but in some applications further control may be desirable. A direct current motor powered vehicle that operates under varying load conditions is an example. While part of its operation may be under varying heavy load conditions, it may also be operated at high speed with light load. Since these types of vehicles normally use series wound motors, the desired wide speed range is obtained by shunting the field winding with a resistance to decrease the flux by decreasing the proportion of armature current through the field and by increasing the EMF on the armature winding. This is often done manually by the operator.

Recently, pulse width modulation or similar control systems have been used to control direct current motors by varying the effective voltage delivered to the motor. Since these systems are efficient and can easily provide for automatic current and voltage limiting operation, it is also desirable to provide automatic field winding shunting. With this invention, means are provided for responding to the current through the motor to connect a shunting resistor in parallel with the field winding when the motor current is below a predetermined first level and for disconnecting the shunting resistor when the current is above another level greater than the first level.

The objects of this invention are: to provide a new and improved motor control system; to provide a new and improved field winding shunting motor control system for a series direct current motor; to provide means for shunting the field winding of a series direct current motor in response to motor current; to provide means for connecting and disconnecting a resistor in parallel with the field winding of a series direct current motor in response to the electrical condition of the motor; to provide automatic means for shunting the field winding of a series direct current motor when the motor current is below a predetermined first level and for removing the shunt when the motor current is above a second predetermined level greater than the first level; and to provide control means for a vehicle powered by a direct current motor that automatically responds to motor current to change motor speed.

Figure 1:
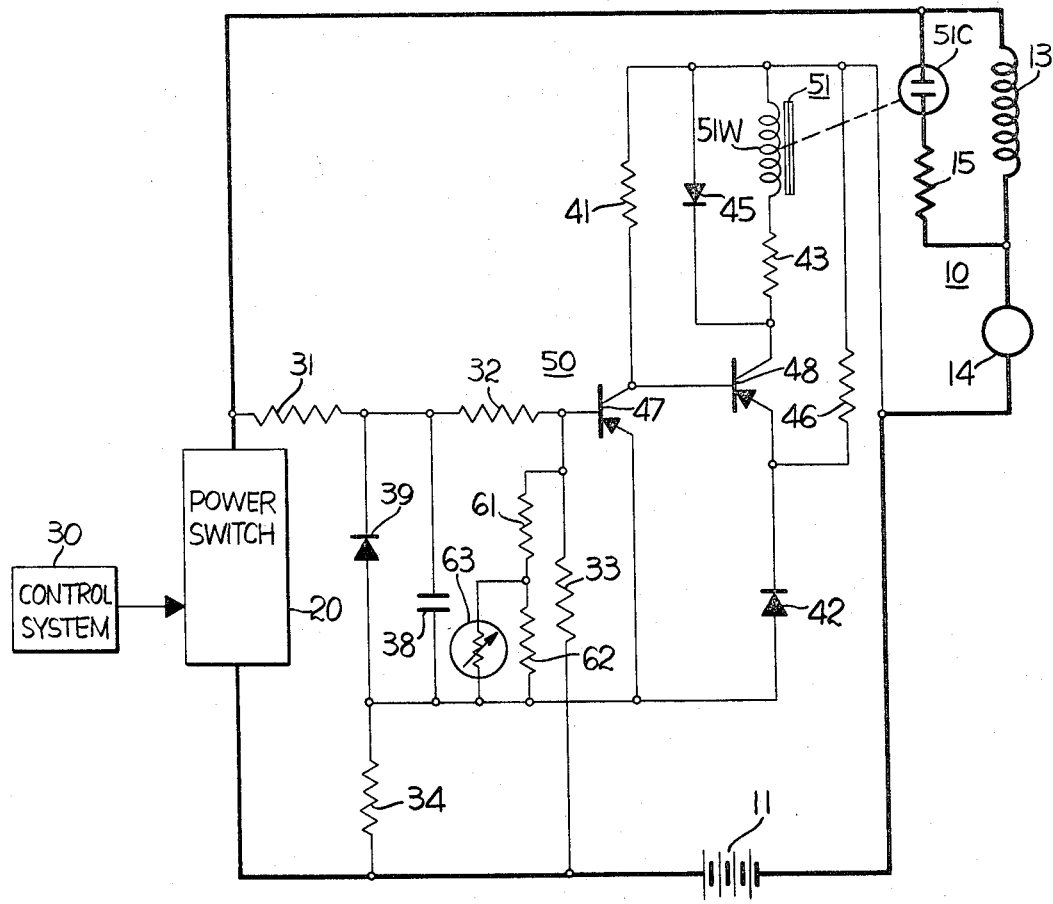
Figure 2:
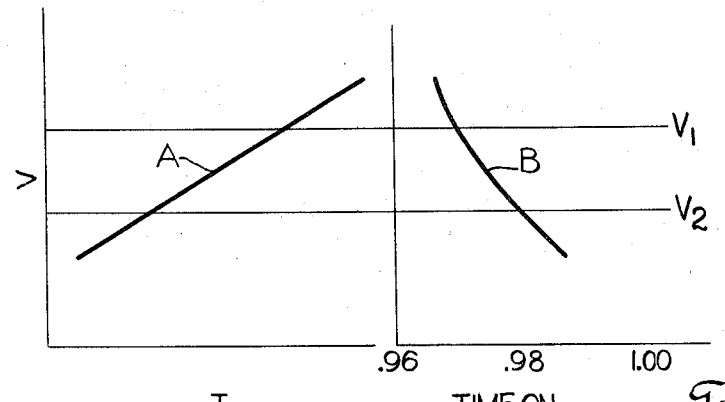

Other objects and advantages will be apparent from the following detailed description:

FIG. 1 is a schematic view of a motor control system embodying this invention; and FIG. 2 is a graph of two illustrative shunting characteristic curves of the control system shown in FIG. 1 with a curve showing the current voltage relationship controlling the shunting and the other curve showing the percent of on-time relationship controlling the shunting.

Referring to FIG. 1, a direct current source, such as a battery 11, is connected to a series direct current motor 10 having a field winding 13 and an armature winding 14. A power switch 20 that has a small resistance when turned on, is connected to respond to an input from a pulse width modulation control system 30 to cyclically connect battery 11 to motor 10. Static control means 50 are provided to shunt field winding 13 through a shunt resistor 15 by energizing a relay 51 to close its contact 51c.

In the embodiment of the invention shown, static control means 50 comprises PNP transistors 47 and 48 and related circuit components. Resistors 31, 32, 33 and 34 are connected to control the input to transistor 47. A temperature compensation network is provided by resistors 61 and 62 and a varistor 63. A diode 39 is connected between the base and the emitter of transistor 47 to pass surge currents and a capacitor 38 is connected to filter the pulsing current created by the cyclic turning on of power switch 20. A diode 42 and a resistor 46 are connected to furnish back bias potential to the emitter-base circuit of transistor 47 when it is turned off. A resistor 41 is connected to limit current through transistor 47 when it is turned on. A resistor 43 and a winding 51w of relay 51 are connected in the collector circuit of transistor 48. A diode 45 is connected to conduct induced reverse current from winding 51w of relay 51 when transistor 48 turns off.

In the operation of the system, when the portion of time of each cycle that power switch 20 is turned on is relatively small, as shown by voltage line B in FIG. 2, or when the current is relatively great, as shown by voltage line A in FIG. 2, the average voltage appearing across power switch 20 is relatively high. At a selected voltage level, the filtered voltage at the base of transistor 47 developed by the voltage divider of resistors 31, 32 and 33 is negative relative to the voltage at the emitter of transistor 47 developed by the voltage divider of resistors 31 and 34, and transistor 47 is turned on. With transistor 47 turned on, transistor 48 is turned off and no current flows through windings 51w of relay 51 and contact 51c is open.

As the average current through motor 10 decreases, the average filtered voltage across power switch 20 decreases, as exemplified by voltage lines A and B in FIG. 2. Voltage line A is plotted at a maximum "on" time and assumes this time to be constant. Voltage line B is plotted at a minimum measuring current and shows the relationship between "on" time and voltage.

The circuits are designed so that when the voltage drops below a selected voltage, such as voltage $V_2$, the potential at the base of transistor 47 is no longer sufficiently negative relative to its emitter to keep transistor 47 turned on and transistor 47 turns off. This disconnects the base of transistor 48 from the positive terminal of the battery (through resistor 34) and the base becomes negative through resistor 41. This turns on transistor 48 and current flows through winding 51w of relay 51 to close contact 51c. This shunts field winding 13 with resistance 15 and decreases the field current and increases the armature voltage to increase motor speed.

When transistor 48 is turned on, transistor 47 does not turn on if the average voltage across power switch 20 increases until the voltage, as exemplified by voltage lines A and B in FIG. 2, increases above a selected level such as voltage $V_1$. This occurs because when transistor 48 is turned off, the potential at the emitter of transistor 47 is effectively zero as resistor 34 is small compared to resistor 46. When transistor 48 is turned on, the potential at the emitter of transistor 47 is primarily determined by the voltage divider of resistor 34, resistor 43, and winding 51w of relay 51. Since the current through winding 51w flows through resistor 34, a voltage drop is produced making the emitter of transistor 47 relatively more negative when transistor 48 is turned on, thereby changing the sensitivity of transistor 47. Therefore, it requires a greater negative potential at the base of transistor 47 to forward bias transistor 47 to turn it on when transistor 48 is turned on.

Thus, when transistor 48 is off, the voltage across resistor 34 is relatively low and a smaller forward biasing voltage keeps transistor 47 turned on. Therefore, transistor 47 is turned off at a relatively low voltage such as voltage $V_2$. However, when transistor 48 is turned on, the voltage drop across resistor 34 is relatively large and applies a relatively large reverse bias to transistor 47 across resistor 33 and changes its sensitivity. Therefore, a larger forward bias such as voltage $V_1$, is required to turn on transistor 47. The voltage at which contact 51c closes is controlled by the selection of the resistance of resistor 31 once the voltage difference between voltages $V_1$ and $V_2$ is primarily determined by resistor 34.

In describing the invention, the preferred embodiment has been shown and described, but it is obvious to one skilled in the art that there are many variations, combinations, alterations and modifications that may be made without departing from the spirit of the invention or from the scope of the appended claims.

I claim:

1. Means for controlling a series direct current motor having a field winding and an armature winding comprising:
   a direct current source connected to energize the motor field winding and armature winding in series;
   a resistance; and
   static means responsive to the current between the source and the motor for connecting the resistance in parallel with the field winding when said current is below a first preselected level, and
   biasing means for controlling the response of said static means to said current and being responsive to operation of said static means to change the bias on said static means so that said static means turns off to disconnect the resistance from the field winding when said current is above a second preselected level greater than said first preselected level.

2. Means for controlling a motor having a field winding comprising:
   a direct current source;
   switching means having a small closed resistance for connecting the source to the motor;
   pulse width modulation means for controlling the operation of the switching means by cyclically closing said switching means for selected periods;
   a resistance; and
   control means responsive to the current through the switching means for connecting the resistance in parallel with the field winding when said current is below a first preselected level, said control means also responsive to the current for disconnecting the resistance from the field winding when said current is above a second preselected level greater than said first preselected level.

3. Means for controlling a direct current motor having a field winding comprising:
   a direct current power source;
   first means for connecting the direct current power source to provide current to the motor;
   second means for producing an output varying in response to the motor current level;
   third means responsive to the output of the second means to produce an output;
   a resistance;
   fourth means for connecting and disconnecting the resistance in parallel with the field winding in response to the output condition of the third means; and
   fifth means for controlling the response of the second means to the motor current level, said means responsive to the condition of the third means to control the response of the second means to control connection of the resistance by the fourth means to connect the resistance when the motor current is below a first preselected level and to disconnect the resistance when the motor current is above a second preselected level greater than said first preselected level.

4. Means for controlling a direct current motor energized by a direct current power source, said means having a field winding, said means comprising:
   means for connecting the direct current power source to provide current to the motor;
   a first switching circuit having a first and second output condition connected to be responsive to the current;
   a second switching circuit connected to be responsive to the first output condition of the first switching circuit to assume one output condition and responsive to the second output condition of said first switching circuit to assume another output condition;
   biasing means for controlling the response of the first switching circuit to the current level, said biasing means responsive to the one output condition of the second switching circuit to bias the first switching circuit to assume the second output condition when said current is below a first preselected level and responsive to the other condition of the second switching circuit to bias the first switching circuit to assume the first output condition when said current is above a second preselected level greater than said first preselected level;
   a resistance; and
   means for connecting the resistance in parallel with the field winding when the second switching circuit is at the one output condition and for disconnecting the resistance from the parallel circuit when the second switching circuit is at the other output condition.

5. Means for controlling a direct current motor having a field winding and an armature winding connected in series, said means comprising:
   a direct current power source;
   means for connecting the direct current power source to provide current to the motor;
   a first semiconductor switching circuit, said first switching circuit connected to be responsive to the current and biased to turn on when said current is less than a first preselected level;
   a second semiconductor switching circuit, said second switching circuit responsive to the condition of the first ciruit to turn on when said first switching circuit is turned off and to turn off when said first switching circuit is turned on;
   means for changing the biasing of the first switching circuit in response to the off condition of the second switching circuit to bias the first switching circuit to turn off when said current is greater than a second preselected current level greater than said first preselected current level;
   a resistance; and
   means responsive to the on condition of the second switching circuit to connect the resistance in parallel with the field winding responsive to the off condition of the second switching circuit and to disconnect the resistance from the field winding.

6. Means for controlling a direct current motor having a field winding and an armature winding connected in series, said means comprising:
a direct current power source;
means for connecting the direct current power source to provide current to the motor;
a first semiconductor switching circuit having an on and an off output condition, said first switching circuit connected to be responsive to the level of said current;
a second semiconductor switching circuit having an on and an off output condition, said second switching circuit responsive to the output condition of the first switching circuit to turn on when said first switching circuit is turned off and to turn off when said first switching circuit is turned on;
biasing means for controlling the response of the first switching circuit to said current level, said biasing means responsive to the on condition of the second switching circuit to turn off the first switching circuit when said current is below a first preselected level and responsive to the off condition of the second switching means to turn the first switching circuit on at a second preselected system current level greater than said first preselected level;
a resistance; and
means for connecting the resistance in parallel with the field winding when the second switching circuit is on and for disconnecting the resistance from the parallel circuit when the second switching circuit is off.

7. Means for controlling a direct current motor having a field winding and an armature winding connected in series, said means comprising:
a direct current power source;
a controlled switch for connecting the direct current power source to provide current to the motor;
a pulse width modulation system connected to control the controlled switch to cyclically connect the source to the motor for preselected portions of each cycle;
a first transistor switching circuit having an on and an off output condition, said first switching circuit connected to be responsive to the current;
a second transistor switching circuit having an on and an off output condition, said second switching circuit responsive to the output condition of the first switching circuit to turn on when said first switching circuit is turned off and to turn off when said first switching circuit is turned on;
biasing means for controlling the response of the first switching circuit to the current level, said biasing means responsive to the output condition of the second switching circuit to bias the first switching circuit to turn off when said current is below a first preselected level and the second switching circuit is on, and to bias the first switching circuit to turn on at a second preselected current significantly greater than said first preselected level when the second switching circuit is turned off;
a resistance; and
means for connecting the resistance in parallel with the field winding when the second switching circuit is on and for disconnecting the resistance from the field winding when the second switching circuit is off.

8. In combination, a direct current motor having a field winding and an armature winding connected in series;
a direct current power source having a first and second terminal with said second terminal connected to one side of the series connected field and armature winding;
a controlled switch having a small resistance when closed, said switch connected between the first terminal of the source and the other side of the series connected field and armature winding;
a pulse width modulation control system for controlling the controlled switch to cyclically connect the direct current source to power the motor for preselected portions of each cycle;
a relay having an energizable winding and a contact, said contact open when said winding is deenergized and closed when said winding is energized;
a shunting resistance connected in series with the contact, said series circuit of said contact and shunting resistance connected in parallel with the field winding;
a voltage divider connected across the controlled switch;
a first transistor having a base, emitter, and collector with said base connected to a selected point on the voltage divider,
said base connection to the voltage divider selected to turn on the first transistor when current through the switch is below a first predetermined level; and
a relatively small resistance connected between the emitter of said first transistor and the first terminal of the source;
a second transistor having a base, emitter, and collector with its base connected to the collector of the first transistor and its emitter connected to the emitter of said first transistor;
a first resistance connected in series with the relay winding between the collector and the second terminal of the source;
a second resistance substantially smaller than the combined resistance of the relay winding and the first resistance, said second resistance connected between the emitter and the second terminal of the source;
said second transistor connected to turn on when the first transistor is turned off and to turn off when the first transistor is turned on, said small resistance selected to increase the forward bias on the first transistor when the first transistor is turned on and the second transistor is turned off to require said current to be greater than said first preselected level in order to turn off said first transistor.

References Cited

UNITED STATES PATENTS

| | | | |
|---|---|---|---|
| 2,853,670 | 9/1958 | Johnstone | 318—532 |
| 2,512,317 | 6/1950 | Edwards et al. | 318—533 X |

ORIS L. RADER, *Primary Examiner.*

H. W. COLLINS, K. L. CROSSON, *Assistant Examiners.*